J. H. LINDBERG.
COURSE INDICATOR.
APPLICATION FILED APR. 12, 1918.

1,292,337.

Patented Jan. 21, 1919.

INVENTOR:
Johan Hjalmar Lindberg
By Wm Wallace White
ATT'Y.

UNITED STATES PATENT OFFICE.

JOHAN HJALMAR LINDBERG, OF STOCKHOLM, SWEDEN.

COURSE-INDICATOR.

1,292,337.  Specification of Letters Patent.  Patented Jan. 21, 1919.

Application filed April 12, 1918. Serial No. 228,265.

*To all whom it may concern:*

Be it known that I, JOHAN HJALMAR LINDBERG, a subject of the King of Sweden, residing at Stockholm, Sweden, have invented new and useful Improvements in Course-Indicators, of which the following is a specification.

My invention relates to a course-indicating instrument adapted for use in conjunction with a chart or map, and has for its object to provide an instrument of this character which materially increases the accuracy with which a ship's course is determined.

I will describe one form of instrument embodying my invention, and will then point out the novel features thereof in claims.

Figure 1:
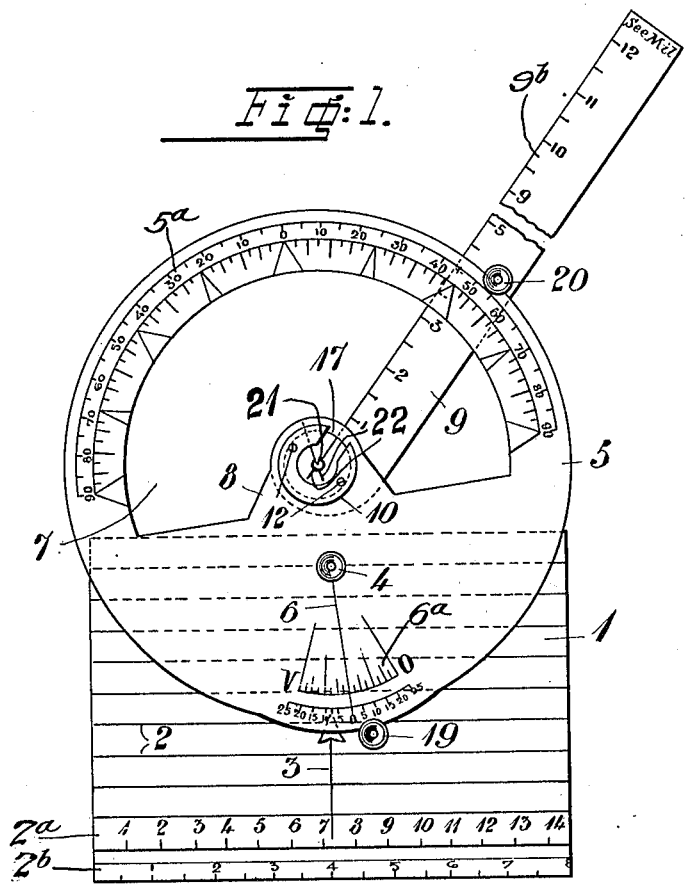
Figure 2:
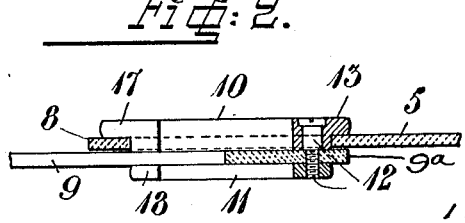

In the accompanying drawings, Figure 1 is a view showing, in top plan, one form of instrument embodying my invention; and Fig. 2 is an enlarged detail view showing, in section, the connection between the ruler 9 and the lip 8.

Referring to the drawings in detail, and particularly to Fig. 1, 1 designates a rectangular sheet of transparent material, such as celluloid or the like, which is provided with transversely extending parallel lines 2, a scale 2ª giving the nautical miles, and a second scale 2ᵇ giving the Swedish new-miles. Arranged at right angles to the lines 2 and intersecting the scale 2ª at a point substantially medially thereof is an arrow 3. In a line prolonged from the arrow 3, as at 4, is rotatably mounted a disk 5, such disk being preferably formed of celluloid or other transparent material. The disk 5 is provided with an opening 7, of a contour to provide a lip 8 which is disposed axially of such disk.

Arranged at the marginal edge of the disk 5 adjacent to the opening 7, is a scale 5ª. This scale 5ª corresponds to the scale of a compass and has its zero point coinciding with the axis of the disk and the pivot point 4. Extending radially from the pivot point 4 is a line 6, such line 6 also coinciding with the axis of the disk and with the zero point of the scale 5ª. When the disk 5 is in the normal position, the line 6 coincides with the arrow 3 and defines the zero point of a graduated scale 6ª, the graduations of such scale extending upon opposite sides of the line as clearly shown in Fig. 1.

9 designates a ruler which, as shown, is pivoted axially to a disk 5 for swinging movement about the compass scale 5ª. As shown in Fig. 1, the inner end of the ruler 9 is formed with a reversely bent hook 9ª which is pivoted to the lip 8 by means of rings 10 and 11, arranged at the opposite sides of the lip and secured to each other by means of screws 12. As shown in Fig. 2, the lip 8 is formed with an opening through which extends the ring 10, such ring being formed with a flange 13 which limits the inward movement thereof and coöperates with the hook 9ª to pivotally secure the ring on the lip and to permit the disk 5 and the ruler 9 to swing independently of each other. As shown in Fig. 1, the rings 10 and 11 are provided with slits 17 and 18 respectively to expose one edge of the ruler 9 so that an entire scale 9ᵇ, impressed upon the ruler for indicating the nautical miles will be seen irrespective of the position of the ruler.

The hook 9ª is provided with a circular opening 21 and extending radially from the opening 21 are two lines 22, which latter are in rectilinear continuation of the edges of the hook to facilitate the correct adjustment of the observation point on a map in the center of the rings 10 and 11.

In order to lock the disk 5 and the ruler 9 in any adjusted position, I provide clamping screws 19 and 20 respectively.

The operation of the instrument is as follows:

The disk 5 is adjusted on the sheet 1 so that the arrow 3 points to that degree on the scale 6ª which corresponds to the amount of deviation of the compass at the observation point. In the drawing, the arrow 3 is shown adjusted to the left of the zero point and between the graduations 5 and 10. The instrument is now adjusted on the map or chart in such a manner that the observation point on the chart comes in the middle of the rings 10 and 11, it being understood that the lines 2 must lie parallel with the lines of latitude of the map or chart. Finally, the ruler 9 is so adjusted that the point toward which the observation is made is disposed at the graduated edge of the ruler, whereupon the course of a ship can be readily determined by the divisions of the scale 5ª at the point at which the ruler intersects the scale.

Although I have herein shown and described only one form of instrument embodying my invention, it is to be understood that various changes and modifications may be made without departing from the spirit and scope of the appended claims.

What I claim is:

1. An instrument of the class described comprising a member adapted to be adjusted according to the degrees of latitude of a map, a second member movable with relation to the first member and having a scale corresponding to the divisions of the compass scale, said second member being formed with an opening to provide an axially disposed lip, said lip being formed with an opening, clamping members mounted in the opening of said lip, a ruler spanning the opening in the second member and having its inner end secured to said clamping members, said ruler being provided with a scale coöperating with the scale on the second member, and said clamping members being formed with openings to expose the graduations of the scale on said ruler during any adjustment of the latter.

2. An instrument as embodied in claim 1, wherein the pivoted end of the ruler is hook-shaped.

3. An instrument as embodied in claim 2, wherein the hook-shaped end of the ruler is formed with a circular opening, and lines on said ruler adjacent said opening coinciding with the inner edges of said hook-shaped end.

In testimony whereof I have signed my name to this specification in the presence of two subscribing witnesses.

JOHAN HJALMAR LINDBERG.

Witnesses:
A. W. C. BAGGE,
J. F. A. RUTBACK.

Copies of this patent may be obtained for five cents each, by addressing the "Commissioner of Patents, Washington, D. C."